United States Patent
Wang et al.

(10) Patent No.: US 12,382,567 B2
(45) Date of Patent: Aug. 5, 2025

(54) ENERGY-EFFICIENT CONTROL OF INDICATOR LIGHTING

(71) Applicant: Dell Products L.P., Round Rock, TX (US)

(72) Inventors: Lei Wang, Chengdu (CN); Yong Lu, Chengdu (CN); Rongbin Zhang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 236 days.

(21) Appl. No.: 18/331,354

(22) Filed: Jun. 8, 2023

(65) Prior Publication Data
US 2024/0407068 A1 Dec. 5, 2024

(30) Foreign Application Priority Data
May 29, 2023 (CN) .......................... 202310620646.9

(51) Int. Cl.
| | |
|---|---|
| H05B 47/115 | (2020.01) |
| G06F 1/18 | (2006.01) |
| G06F 11/30 | (2006.01) |
| G06F 11/32 | (2006.01) |

(52) U.S. Cl.
CPC ........... *H05B 47/115* (2020.01); *G06F 1/181* (2013.01); *G06F 11/3055* (2013.01); *G06F 11/325* (2013.01)

(58) Field of Classification Search
CPC ... H05B 47/115; G06F 1/181; G06F 11/3055; G06F 11/325; G06F 1/3265; G09G 3/14
See application file for complete search history.

(56) References Cited

U.S. PATENT DOCUMENTS

| | | | | |
|---|---|---|---|---|
| 9,210,759 | B2 * | 12/2015 | Reed | H05B 47/11 |
| 2014/0184418 | A1 * | 7/2014 | Maeda | F24F 11/63 |
| | | | | 340/691.6 |
| 2018/0315287 | A1 * | 11/2018 | Gray | G08B 21/22 |
| 2019/0174608 | A1 * | 6/2019 | Verfuerth | H05B 47/19 |
| 2019/0242562 | A1 * | 8/2019 | Chien | F21V 23/023 |
| 2020/0267810 | A1 * | 8/2020 | Chemel | H05B 47/16 |
| 2021/0349680 | A1 * | 11/2021 | Kim | G06F 3/0488 |
| 2022/0031244 | A1 * | 2/2022 | Windmiller | A61B 5/14514 |
| 2022/0299190 | A1 * | 9/2022 | Chemel | F21V 29/763 |
| 2022/0334621 | A1 | 10/2022 | O'Donnell et al. | |

FOREIGN PATENT DOCUMENTS

| | | | | | |
|---|---|---|---|---|---|
| CN | 110831249 | A | * | 2/2020 | ............ H04W 76/11 |
| CN | 115723690 | A | * | 3/2023 | |
| WO | WO-2021231412 | A1 | * | 11/2021 | ......... G06F 3/04812 |

\* cited by examiner

*Primary Examiner* — Abdullah A Riyami
*Assistant Examiner* — Syed M Kaiser
(74) *Attorney, Agent, or Firm* — Jackson Walker L.L.P.

(57) ABSTRACT

An information handling system may include a processor, at least one visual indicator communicatively coupled to the processor and configured to visually indicate status information associated with the information handling system, and a motion sensor communicatively coupled to the at least one visual indicator and configured to detect for a presence of motion proximate to the information handling system and in the presence of motion proximate to the information handling system, cause the at least one visual indicator to be enabled to illuminate in order to visually indicate the status information.

13 Claims, 2 Drawing Sheets

ENERGY-EFFICIENT CONTROL OF INDICATOR LIGHTING

TECHNICAL FIELD

The present disclosure relates in general to information handling systems, and more particularly to systems and methods for energy-efficient control of indicator lighting, for example an illuminated indictor disposed in an information handling system bezel.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system datacenters often include tens to hundreds of rack enclosures—each containing multiple servers, storage devices, and network switches. Each server may include one or more visual indicators (e.g., light emitting diodes) that present information to users (e.g., administrators/information technology technicians, etc.). In existing information handling systems, such lighting is typically designed to remain permanently lit once the information handling system is powered on. In large data centers, such visual indicators may, in the aggregate, consume significant amounts of power. Accordingly, systems and methods to minimize such power consumption, while still providing visual indication of information handling system status to a person (e.g., information technologist or administrator) may be desirable.

SUMMARY

In accordance with the teachings of the present disclosure, the disadvantages and problems associated with existing approaches to provision of indicator lighting may be reduced or eliminated.

In accordance with embodiments of the present disclosure, an information handling system may include a processor, at least one visual indicator communicatively coupled to the processor and configured to visually indicate status information associated with the information handling system, and a motion sensor communicatively coupled to the at least one visual indicator and configured to detect for a presence of motion proximate to the information handling system and in the presence of motion proximate to the information handling system, cause the at least one visual indicator to be enabled to illuminate in order to visually indicate the status information.

In accordance with these and other embodiments of the present disclosure, a method may be provided for use in an information handling system comprising a processor and at least one visual indicator communicatively coupled to the processor and configured to visually indicate status information associated with the information handling system. The method may include detecting for a presence of motion proximate to the information handling system and in the presence of motion proximate to the information handling system, causing the at least one visual indicator to be enabled to illuminate in order to visually indicate the status information.

In accordance with these and other embodiments of the present disclosure, a system may include at least one visual indicator configured to visually indicate status information associated with the system and circuitry communicatively coupled to the at least one visual indicator and configured to detect for a presence of motion proximate to the system and in the presence of motion proximate to the system, cause the at least one visual indicator to be enabled to illuminate in order to visually indicate the status information.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
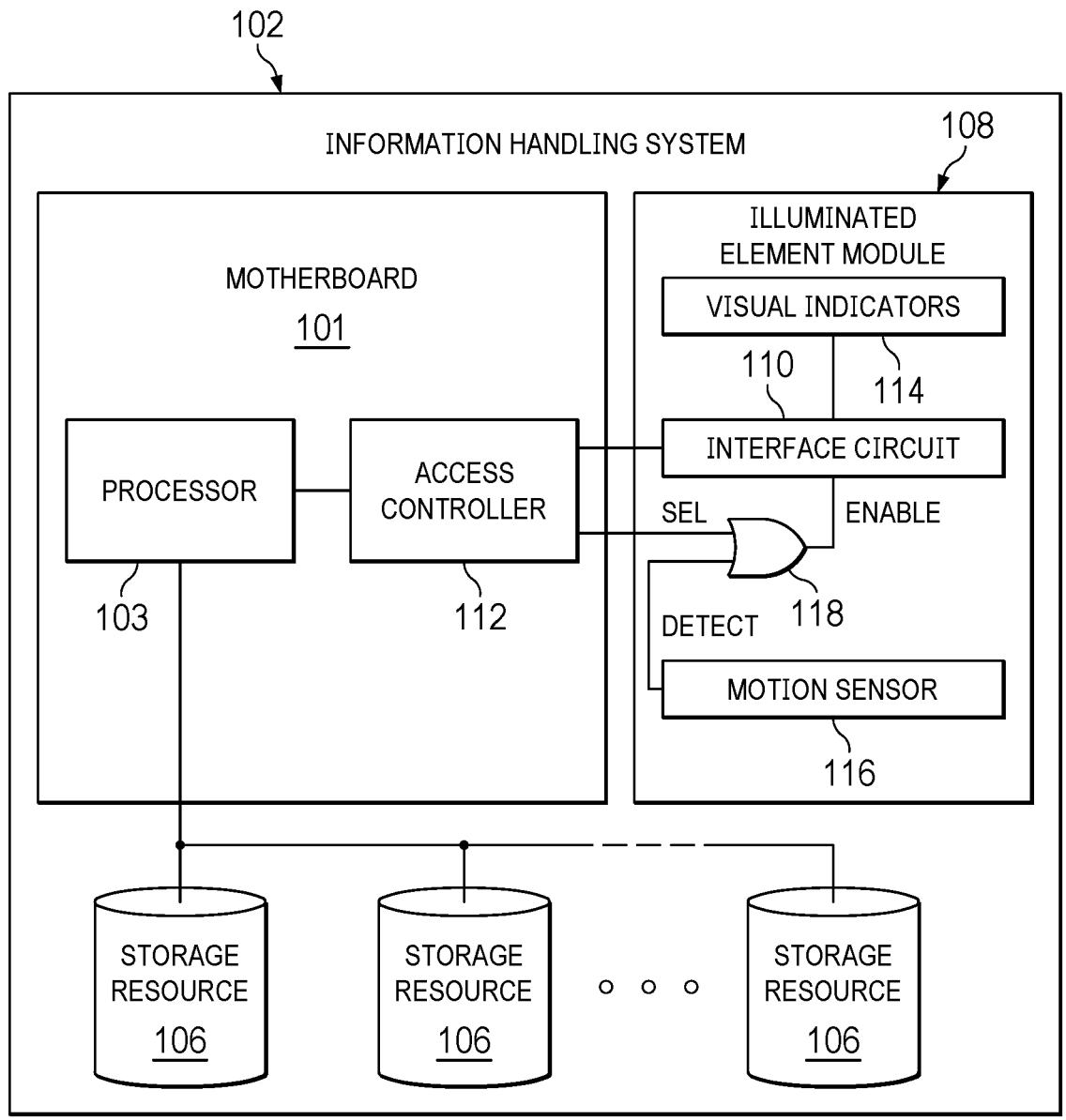
FIG. 1 illustrates a block diagram of selected components of an example information handling system, in accordance with embodiments of the present disclosure.
Figure 2:
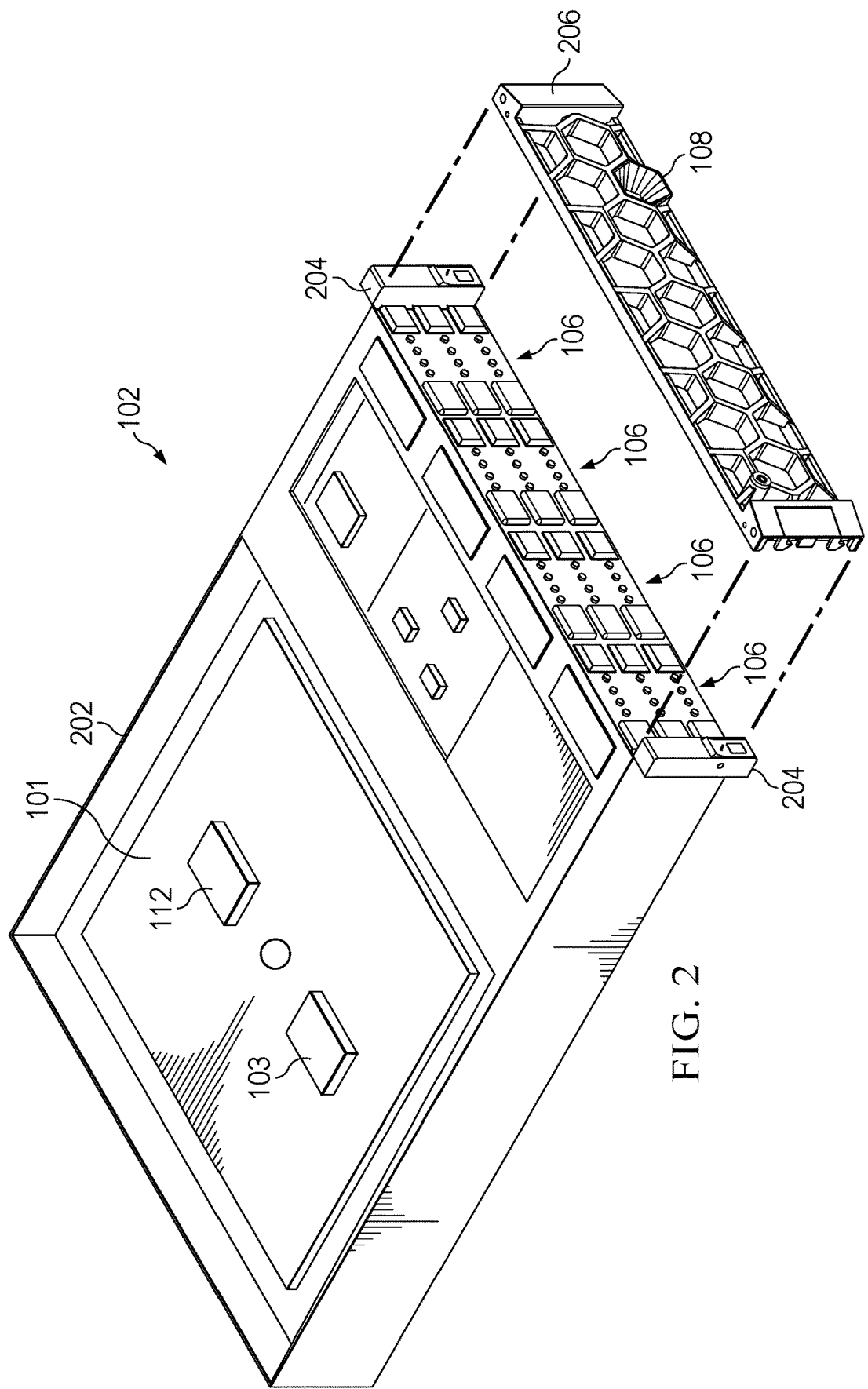
FIG. 2 illustrates a perspective view of selected components of the example information handling system of FIG. 1, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RA), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs) etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

FIG. 1 illustrates a block diagram of an example information handling system 102. In some embodiments, information handling system 102 may comprise a server. In other embodiments, information handling system 102 may comprise networking equipment for facilitating communication over a communication network. In yet other embodiments, information handling system 102 may comprise a personal computer, such as a laptop, notebook, or desktop computer. In yet other embodiments, information handling system 102 may be a mobile device sized and shaped to be readily transported and carried on a person of a user of information handling system 102 (e.g., a smart phone, a tablet computing device, a handheld computing device, a personal digital assistant, etc.).

As shown in FIG. 1, information handling system 102 may include a motherboard 101, one or more storage resources 106, and an illuminated element module 108. Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103 and an access controller 112 communicatively coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a storage resource 106, memory and/or another component of information handling system 102.

Access controller 112 may be communicatively coupled to processor 103 and may comprise any system, device, or apparatus configured to facilitate management and/or control of components of information handling system 102, information handling systems modularly coupled within, and/or one or more of its component information handling resources. Access controller 112 may be configured to issue commands and/or other signals to manage and/or control information handling resources of information handling system 102. Access controller 112 may comprise a microprocessor, microcontroller, DSP, ASIC, field programmable gate array ("FPGA"), EEPROM, or any combination thereof.

In addition or alternatively, access controller 112 may also provide a management console for user/administrator access to these functions. For example, access controller 112 may provide for communication with a user interface, permitting a user to interact with access controller 112 and configure control and management of components of information handling system 102 by access controller 112. As another example, access controller 112 may act as a proxy and establish communication between two information handling resources by either configuring them to directly couple to each other or transfer information by receiving information from one information handling resource, processing the information if needed, and then transferring the information to the other information handling resource. As a further example, access controller 112 may implement Web Services Management ("WS-MAN") or another suitable management protocol permitting a user to remotely access an access controller 112 to configure information handling system 102 and its various information handling resources. In such embodiments, access controller 112 may interface with a network interface separate from a traditional network interface of information handling system 102, thus allowing for "out-of-band" control of information handling system 102, such that communications to and from access controller 112 are communicated via a management channel physically isolated from an "in band" communication channel with the traditional network interface. Thus, for example, if a failure occurs in information handling system 102 that prevents an administrator from interfacing with information handling system 102 via a traditional network interface and/or user interface (e.g., operating system failure, power failure, etc.), the administrator may still be able to monitor and/or manage information handling system 102 (e.g., to diagnose problems that may have caused failure) via access controller 112. In the same or alternative embodiments, access controller 112 may allow an administrator to remotely manage one or more parameters associated with operation of information handling system 102 and its various information handling resources (e.g., power usage, processor allocation, memory allocation, security privileges, etc.). In certain embodiments, access controller 112 may include or may be an integral part of a chassis management controller (CMC), a baseboard management controller (BMC), Dell Remote Access Controller (DRAC) or an Integrated Dell Remote Access Controller (iDRAC).

Storage resources 106 may be communicatively coupled to processor 103, and may include any system, device, or apparatus configured to retain program instructions and/or data for a period of time (e.g., computer-readable media). Storage resources 106 may include hard disk drives, magnetic tape libraries, optical disk drives, magneto-optical disk drives, compact disk drives, compact disk arrays, disk array controllers, and/or any other system, apparatus or device operable to store media.

Illuminated element module 108 may be communicatively coupled to access controller 112 and may comprise any suitable system, apparatus, or device operable to dynamically illuminate an array of one or more visual indicators 114 in order to communicate visual information to a user. For example, illuminated element module 108 may include an array of addressable visual indicators 114, arranged in a circle, row, bank, or other suitable manner. Each visual indicator 114 may include one or more light-emitting diodes, or one or more other sources of light.

Illuminated element module 108 may also include an interface circuit 110 communicatively interfaced between access controller 112 and visual indicators 114, in order to allow access controller 112 to control illumination of individual visual indicators 114 of illuminated element module 108, for example as described in U.S. patent application Ser. No. 17/232,846, filed Apr. 16, 2021, and incorporated by reference herein.

Illuminated element module 108 may also include a motion sensor 116. Motion sensor 116 may include any suitable system, device, or apparatus configured to detect the presence or absence of motion proximate to information handling system 102 and generate a detection signal DETECT (e.g., a binary signal) indicative of such presence or absence.

Further, illuminated element module 108 may also include a logical OR circuit 118 configured to perform a logical OR of detection signal DETECT and a selection signal SEL generated by access controller 112 to generate an enable signal ENABLE for selectively enabling or disabling interface circuit 110.

As also described below, components of illuminated element module 108 may be disposed in a bezel (e.g., a front cover) of information handling system 102.

In addition to motherboard 101, processor 103, storage resources 106, access controller 112, illuminated element module 108, interface circuit 110, visual indicators 114, motion sensor 116, and logical OR circuit 118, information handling system 102 may include one or more other information handling resources.

FIG. 2 illustrates a perspective view of selected components of information handling system 102, in accordance with embodiments of the present disclosure. As shown in FIG. 2, information handling system 102 may comprise a housing 202 to house components of information handling system 102. In some embodiments, housing 202 may include a chassis or other enclosure including one or more mechanical features for supporting the various components of information handling system 102. In other embodiments, housing 202 may comprise a drawer or tray configured to be inserted into or removed from a server rack for housing multiple information handling systems.

As shown in FIG. 2, housing 202 may include ears 204 and a bezel 206. Bezel 206 may comprise any suitable mechanical structure for covering a front portion of information handling system 102. For example, bezel 206 may cover storage resources 106 for purposes of security and/or aesthetics. As described in greater detail below, bezel 206 may be readily detachable from the remainder of chassis 202 via ears 204. Bezel 206 may also include one or more mechanical features for housing illuminated element module 108.

An ear 204 may include one or more mechanical features for mechanically coupling bezel 206 to the remainder of housing 202 via corresponding mechanical features of bezel 206. In addition, as described in greater detail below, at least one ear 204 and bezel 206 may include corresponding electrically-conductive components permitting illuminated element module 108 to draw power, provide alerts, and/or communicatively couple to access controller 112 when bezel 206 is engaged with ears 204. In embodiments in which housing 202 comprises a drawer or sled, ears 204 may comprise mechanical components to allow a user to slide housing 202 into or out of a rack.

In operation, access controller 112 may determine whether an error condition is present within information handling system 102. In addition to causing interface circuit 110 to generate a particular lighting pattern for visual indicators 114 in response to an error, access controller 112 may also assert selection signal SEL (e.g., set selection signal to logic "high" or logic "1") in response to an error, and otherwise deassert selection signal SEL (e.g., set selection signal to logic "low" or logic "0") in the absence of an error.

Further, in operation, motion sensor 116 may assert detection signal DETECT in the presence of motion proximate to information handling system 102 and otherwise deassert detection signal DETECT in the absence of motion proximate to information handling system 102.

As a result, logical OR circuit 118 may assert enable signal ENABLE when an error condition is present within information handling system 102 and/or when motion is present proximate to information handling system 102, and may otherwise deassert enable signal ENABLE in the absence of an error condition within information handling system and the absence of motion proximate to information handling system.

When enable signal ENABLE is asserted, interface circuit 110 may be enabled, in turn enabling illumination by visual indicators 114. On the other hand, when enable signal ENABLE is deasserted, interface circuit 110 may be disabled, in turn disabling illumination by visual indicators 114. Accordingly, power consumption by visual indicators 114 may be minimized, as visual indicators 114 may illuminate only when a person (e.g., an information technologist and/or administrator) is proximate to information handling system 102 in order to view visual indicators 114 and/or an error condition is present within information handling system 102.

Although the foregoing contemplates illumination in the presence of an error signal or in the presence of motion, in some embodiments, logical OR circuit 118 may not be present, and enablement of interface circuit 110 may be conditioned solely upon the presence or absence of motion. For example, in such cases, enable signal ENABLE and detection signal DETECT may be the same or logically equivalent.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
    a processor;
    at least one visual indicator communicatively coupled to the processor and configured to visually indicate status information associated with the information handling system;
    a motion sensor communicatively coupled to the at least one visual indicator and configured to:
        detect for a presence of motion proximate to the information handling system; and
        in the presence of motion proximate to the information handling system, cause the at least one visual indicator to be enabled to illuminate in order to visually indicate the status information;
    an access controller configured to:
        determine whether an error condition is present within the information handling system; and
        in presence of the error condition within the information handling system, cause the at least one visual indicator to be enabled to illuminate in order to visually indicate the status information; and
    logic configured to in absence of motion proximate to the information handling system and absence of the error condition within the information handling system, cause the at least one visual indicator to be disabled from illumination.

2. The information handling system of claim 1, wherein causing the at least one visual indicator to be disabled from illumination comprises disabling an interface circuit coupled between the at least one visual indicator and the logic.

3. The information handling system of claim 1, the motion sensor further configured to, in absence of motion proximate to the information handling system, cause the at least one visual indicator to be disabled from illumination.

4. The information handling system of claim 3, wherein causing the at least one visual indicator to be disabled from illumination comprises disabling an interface circuit coupled between the at least one visual indicator and the motion sensor.

5. The information handling system of claim 1, further comprising a bezel configured to house the at least one visual indicator.

6. A method for use in an information handling system comprising a processor and at least one visual indicator communicatively coupled to the processor and configured to visually indicate status information associated with the information handling system, the method comprising:
    detecting for a presence of motion proximate to the information handling system;
    in the presence of motion proximate to the information handling system, causing the at least one visual indicator to be enabled to illuminate in order to visually indicate the status information;
    determining whether an error condition is present within the information handling system;
    in presence of the error condition within the information handling system, causing the at least one visual indicator to be enabled to illuminate in order to visually indicate the status information; and
    in absence of motion proximate to the information handling system and absence of the error condition within the information handling system, causing the at least one visual indicator to be disabled from illumination.

7. The method of claim 6, wherein causing the at least one visual indicator to be disabled from illumination comprises disabling an interface circuit configured to control the at least one visual indicator.

8. The method of claim 6, further comprising in absence of motion proximate to the information handling system, causing the at least one visual indicator to be disabled from illumination.

9. The method of claim 8, wherein causing the at least one visual indicator to be disabled from illumination comprises disabling an interface circuit configured to control the at least one visual indicator.

10. A system comprising:
   at least one visual indicator configured to visually indicate status information associated with the system; and
   circuitry communicatively coupled to the at least one visual indicator and further configured to:
      detect for a presence of motion proximate to the system;
      in the presence of motion proximate to the system, cause the at least one visual indicator to be enabled to illuminate in order to visually indicate the status information;
      determine whether an error condition is present within the system;
      in presence of the error condition within the system, cause the at least one visual indicator to be enabled to illuminate in order to visually indicate the status information; and
      in absence of motion proximate to the system and absence of the error condition within the system, cause the at least one visual indicator to be disabled from illumination.

11. The system of claim 10, wherein causing the at least one visual indicator to be disabled from illumination comprises disabling an interface circuit coupled between the at least one visual indicator and the circuitry.

12. The system of claim 10, the circuitry further configured to, in absence of motion proximate to the system, cause the at least one visual indicator to be disabled from illumination.

13. The system of claim 12, wherein causing the at least one visual indicator to be disabled from illumination comprises disabling an interface circuit coupled between the at least one visual indicator and the circuitry.

* * * * *